Dec. 28, 1965     E. HUETTEMANN     3,226,242
HIGH STRENGTH CEMENTITIOUS PRODUCTS AND
A PROCESS FOR THEIR PRODUCTION
Filed June 19, 1963     2 Sheets-Sheet 1
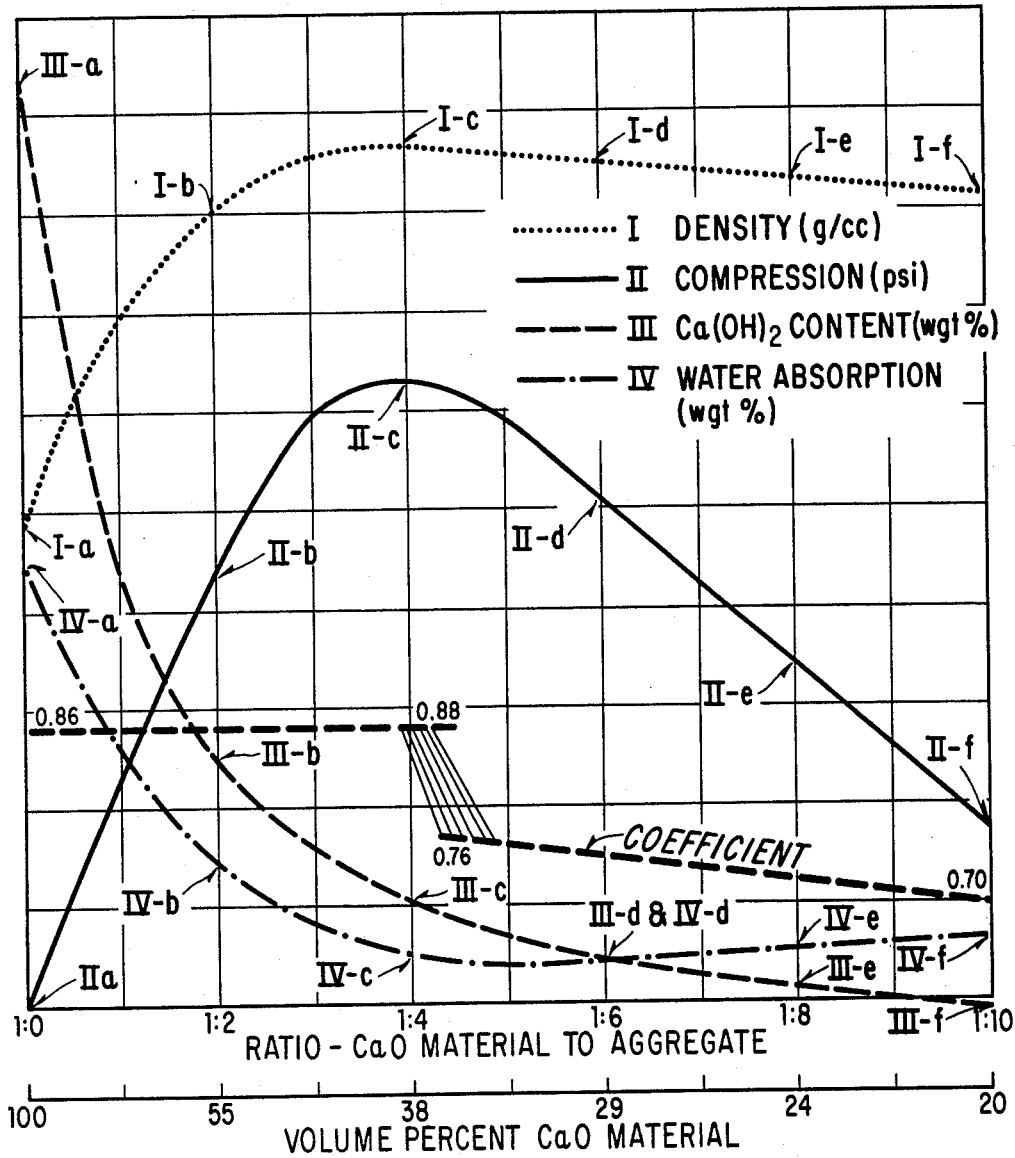
FIG. I.
INVENTOR
ERIC HUETTEMANN
BY [signature]
ATTORNEY

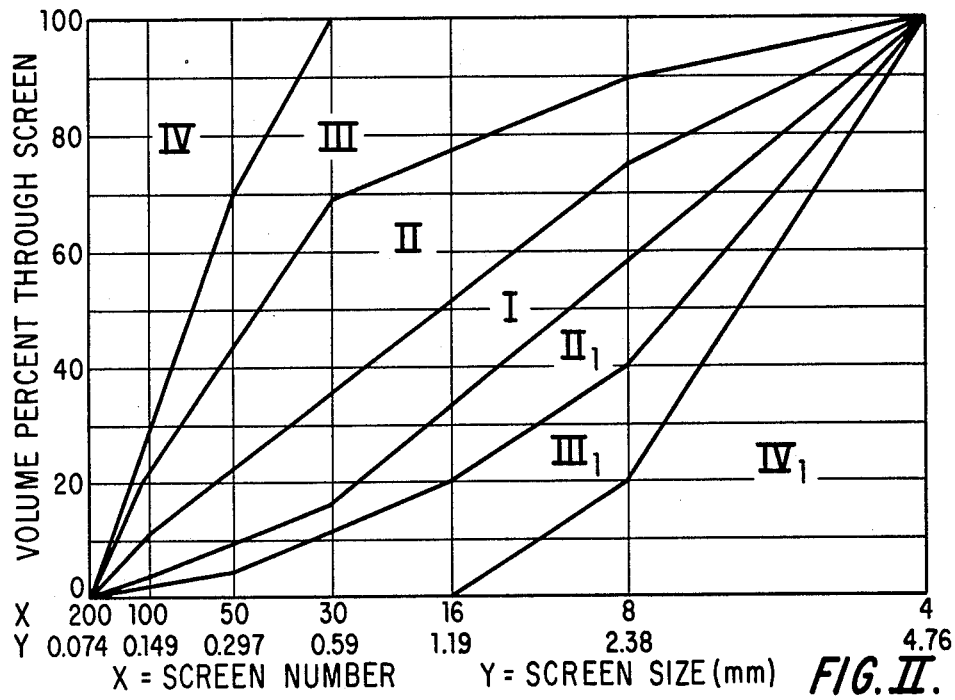
FIG. II.
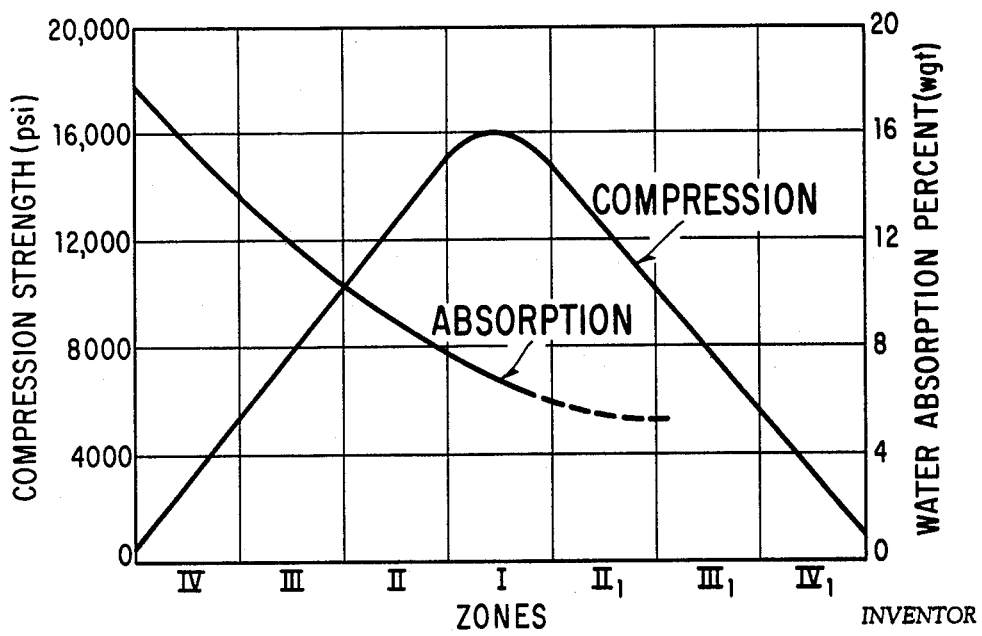
FIG. III.
INVENTOR
ERIC HUETTEMANN
BY
ATTORNEY

3,226,242
HIGH STRENGTH CEMENTITIOUS PRODUCTS AND A PROCESS FOR THEIR PRODUCTION
Eric Huettemann, 4520 Clinton St., Buffalo, N.Y.
Filed June 19, 1963, Ser. No. 289,098
8 Claims. (Cl. 106—98)

This application is a continuation-in-part of my co-pending application Serial Number 785,576 filed January 8, 1959, now abandoned.

This invention relates to a process for the preparation of building materials, such as concrete blocks, bricks and the like and to the products thereby produced and more particularly relates to the preparation of compressed concrete finished products prepared from a cementitious material containing powdered sand compacted in and circumjacent to aggregate particles.

An object of the invention provides a process for the manufacture of molded concrete blocks, bricks and other articles of high density and exceptionally high strength. Other objects include: means of producing high density concrete products containing a comminuted binder material and aggregate; a concrete product of high density, minimum water absorption and low shrinkage; a compressed and molded concrete block having a cured compressive strength of at least 1000 kg. per sq. cm.; a cementitious CaO containing material and powdered sand for forming with selected aggregates and prescribed amounts of water high density products; compacting means for obtaining high density and high strength molded and cured concrete products; an aggregate of high density and strength the spaces between the particles thereof being filled with and the particles thereof being circumjacent to a bonding agent of cementitious material and sand both in powdered form. Other objects and advantages of the invention will hereinafter appear.

In the normal production of concrete finished parts the procedure is to dry mix cement, sand and gravel in the proportions shown on the Fuller curve, this mixture is then mixed with water and the wet concrete is vibrated in molds and air hardened. The normal process of air hardening requires 28 days before a maximum value is reached. With a cement content of 300 kg. per cubic meter the products possess a strength of about 250 to 300 kg. per square centimeter and with a cement content of 500 kg. per cubic meter they possess a strength of 500 to 650 kg. per square centimeter. In an effort to obtain better quality products with greater strength and the least possible content of cement, in the shortest possible time, considerable use has been made of the vibrating and hydraulic pressure equipment for compacting the mix in molds, and wherein for this use the water-cement factor is kept as low as possible. It is further known how to cure finished concrete products by means of steam, wherein a complete saturation by water vapor is aimed at. In this connection it has already been suggested that a pre-hardening stage at about two hours be used prior to the steam curing.

On the other hand a process for the production by the use of steam curing of molded products bound by hydrosilicates and consisting mainly of coarse aggregates, such as sand, gravel or the like, is already known, in which a similar mixture of hydroxides such as calcium hydroxide or magnesium hydroxide is used as a binder, finely divided silicic acid and water. At least 80% of the constituents of the silicic acid should pass through a 10,000 mesh per sq. cm. screen and in general all of it should pass through a 5000 mesh per sq. cm. screen. The products molded by the addition of coarse aggregates and cured in an auto-clave preferably with high steam pressure show strengths of about 770 kg. per square cm.

The invention herein disclosed has set for its goal the production of concrete finished products of particularly high density and strength. Experiments disclosed in recent times (Concrete Block Journal 23, 1957, pp. 313–316) show that it is possible by the use of 530 kg. of cement per cubic meter and a water-cement factor of 0.27 and utilizing a very special granulated synthesis aggregate consisting of Rhine sand and blast furnace slag to obtain strength of nearly 1000 kg. per cubic cm. by curing and using a vibrator, if high early cement 325 or Portland cement 425 is used. Surprising though it may seem, it has now been ascertained that by the use of considerably more economical binder constituents and lesser quantities of cement strengths can still be secured that considerably surpass 1000 kg. per cubic cm. with absolute freedom of stress and with a shrinkage factor of less than 0.1 millimeter per meter.

In accordance with this invention finished high density concrete products are obtained by using cement as the binder with conventional aggregates and then vibrating and steam curing the molded parts, but it is also possible to use a mixture of lime, cement and fine sand powder as a binder, which is prepared with the necessary quantity of water to produce a viscous to plastic consistency and is then mixed with the aggregates. The use of mixtures of lime, cement and finely ground sand is known per se in the case of artificial stones, but what is involved here is a matter of light building materials with strengths of around 220 kg. per square cm. and which possess a volumetric weight (density) of up to 1.0 and in some special cases perhaps 1.4.

It has repeatedly been sought to obtain finished concrete products with a normal volumetric weight of 2.0 to 2.4 with increased strength, by the use of a part of the sand in finely ground state. In this case, however, an addition of 40% of finely ground sand, related by weight to the finished product, is required. In contrast in the process disclosed herein only about 15% to 20% of the solid aggregate is required as finely ground sand. Up to now the production of steam-cured finished concrete products has been accomplished by the use of cement without the addition of lime. Thus, although in light construction materials like sand-lime brick the use of a more or less slight addition of cement has been known, nevertheless the thought has been far removed from everyone's mind that it would be possible to produce finished concrete products of normal volumetric weight (density) and with strengths of 1000 kg. per square cm. and higher by the use of cement, lime and finely ground sand. It is of particular significance that in actual practice according to the disclosures contained herein high strengths are obtained even at a binder protection of 280 kg. per cubic meter and by the use of round-grained standard sand without specially selected grain fractions.

In the process according to the invention about 40% of CaO cement with about 60% of finely ground sand (a maximum of 5% to 15% residue on the 4900 mesh screen) is used. The quantitative proportion of cement to lime can range from 4 to 32% of cement to 8 to 36% of CaO. In general, however, it is advisable to process 12 to 26% by weight of cement and 14 to 28% by weight of CaO with 60% of fine sand powder. Particularly favorable results have been achieved with equal parts, thus 20% CaO and 20% of cement to 60% of fine sand powder.

In the foregoing the quantities of lime are related to CaO, but it is not necessary to use burnt lime but rather we can use slaked lime or the powder of hydrate of lime. In any event, however, the quantity of water to be used is to be measured in such a way that the binder mixture alone, without the aggregates, shall attain the consistency of viscous to plastic. This consistency is dependent upon the proportion of the dry binder mix to the aggregates. Therefore, in order to attain maximum strength the recommended proportion of 1 part of the mixture of lime, cement and fine sand dust to two or three, preferably 2 to 2.5 parts of aggregates, such as coarse sand, gravel, fragments etc. If this proportion is not in excess of 1:2.5, plastic consistency of the prepared binder is advisable, but if a higher coarse portion is to be used then a viscous consistency may be required.

If very high strengths of say 1000 kg. per square cm. are not required and for example even strength of from 500 to 600 kg. per square cm. suffice, a very slight portion of the binder will suffice and the proportion mentioned in the foregoing can be reduced to 1 part by weight of dry binder mixture to 3 to 4 parts by weight of aggregates. However, in this case the addition of water will have to be adjusted again to viscous consistency of the binder. The quantities of water to be used in the particular instances are to be ascertained more accurately by experiments, since they depend on the lime: cement proportion and are also predicated upon the type of lime and its grain size. In every case care must be exercised in order to obtain the viscous to plastic consistency of the binder mixture first and then mix the binder with the aggregates in a proper kneading manner in a mixer. As a result of this mixing the mass that is to be molded into a product is not capable of being poured but rather has to be packed by vibrating or pressurizing in order that all voids may be filled and a proper molded product result.

In view of the fact that the binder mixture of lime, cement and sand powder has to completely fill out all interstices between the individual coarse aggregate particles, it is advisable, where particularly high strengths are required, to conduct say after a half hour or an hour a subsequent vibrating or pressurizing to further pack the mass in order to insure maximum density. This subsequent packing can be repeated from one to three times at intervals of from one half to one hour.

Because of the cement content the molded products harden and set in the air immediately after their packing into the molds, this turns out to be particularly advantageous for large building products such as precast beams of complicated molded shapes. If they are cured first for two or three hours after molding in the auto-clave, the molds can be stripped, the products placed on plates or platters or the like, after which they can again be easily and safely conveyed again into the auto-clave for final curing.

It is not necessary that the water be added to the mixture of dry binder prior to its admixture to the coarse aggregates, it can be added with or after the admixture of these aggregates as desired. However, it is of extreme importance that the quantity of water be so measured that the dry binder mixture of lime, cement and sand powder should always have from viscous to preferably plastic consistency. Thus if the water is scheduled to be admixed with or after the admixture of the coarse aggregates the required quantity of water must first be ascertained on a specimen of the binder without the aggregates. On the other hand, however, the water should only be allowed after the lime, cement and sand have been jointly ground down to the required fineness.

An advantageous form of execution of the process whereby high strengths may be attained lies in an arrangement whereby burnt lime becomes the starting point and it is ground down at first in proportions of 8 to 36 parts by weight with 60 parts by weight of sand to a fineness that will enable all but from 5 to 15% to pass through a 4900 mesh screen. To this mixture there is added precisely as much water as may be needed to completely slake all of the burnt lime, thus the theoretical hydrate water plus an extra amount for evaporation of about 10 to 20%. The complete slaked product of the grinding should in any event be completely dry, in order to be subsequently thoroughly mixed with the cement.

It is advisable to store this slaked product of the grinding process in an insulated silo in order to control the loss of heat, for a period of from 12 to 24 hours, in which case the slaking process continues with an evolution of heat which results in the formation of certain quantities of soluble silicic acid. After the silo storage slaking the powder becomes dry and is then thoroughly mixed with 4 to 32 parts of cement by weight. The binder mixture so obtained is then mixed with the coarse aggregates and the necessary amount of water, then molded into products and placed into the auto-clave for curing by means of steam.

The mixture of lime, cement, sand powder and water without the coarse aggregate posesses a crude density of more than 1.3. The finished products after the addition of the aggregates possessed a crude density of 2.1 to 2.4 at a content of cement plus lime of 240 to 300 kg. per cubic meter. Whereas normal finished concrete products with like percentages of content of such kind possess only strengths from 250 to 400 kg. per square cm. or in the case of percentages of content of cement of 500 kg. per cubic meter lengths of 500 to 650 kg. per square cm. and shrinkages of from 0.3 to 0.5 mm. per meter, the products made according to the invention distinguish themselves by strengths of from 1000 to 1500 kg. per square cm. with a maximum shrinkage of 0.1 mm. per meter and absolute freedom from internal stress as well as stability to frost and ground water.

Example 1:
    200 kg. of CaO (added as 265 kg. of lime hydrate powder 200 kg. of CaO plus 65 kg. of water)
    +200 kg. of Portland cement (standard 225)
    +600 kg. of sand
    =1000 kg. of crude powder to be ground to about 5% residue on the 4900 mesh screen.

This binder mixture can be used in two ways:

(a) Enough water is added to the crude powder mixture to result in a kneadable plastic consistency. 2000 kg. of coarse sand of grain size 0.5 mm. up to 3 mm. or 2000 kg. of a mixture of coarse sand, gravel or fragments of a grain size of from 0.5 to 50 mm., fractionated according to the Fuller curve, is admixed to or kneaded into this plastic binder mixture without the further addition of water.

The mass, immediately after the thorough kneading is filled into molds, is vibrated and pounded and if need be pressed. One half hour after the molding it is again vibrated, etc., and after another half hour it is again vibrated. At this juncture the mold is removed and it is completely cured in the auto-clave by 8 atmospheres of steam pressure after 8 hours.

(b) from a specimen of the dry crude powder there is established the amount of water necessary to obtain the plastic consistency. From this figure the total water addition for 1000 kg. of crude powder is computed. Now the 1000 kg. of crude powder mixture + 2000 kg. of coarse sand of the above mentioned granulation or + 2000 kg. of coarse sand, gravel (fragments) of a granulation of about 0.5 mm. to 50 mm. is kneaded through and thoroughly mixed with the computed quantity of water.

After this, as indicated under (a), filling into molds, vibrated, jolted, pounded or pressed, etc., as well as subsequent vibratings demolding and hardening is accomplished.

Example 2:
    Crude powder composition, addition of water and coarse aggregates as indicated in 1(a) and 1(b). After mixing all the residual portions completely the mass is prepared for molding and is stored for one to three hours until the solidification of the the cement portion is completed and the curing of the cement portion begins. The mass is then vibrated into molds, after which the molds are removed and the products are placed into the autoclave for the final curing and hardening under steam pressure. In this case no revibrating, etc., is required.

Example 3:

200 kg. of CaO added as burnt unslaked lime+600 kg. of sand=800 kg. of lime-sand mixture which is ground to a grain size such that all but 5% will pass through a 4900 mesh screen and is thoroughly mixed with the water addition=sand and about 10 to 20% evaporation water necessary for the hydration of the lime. In this example there is accordingly 65 kg. of water plus about 15 kg. of evaporation water to be admixed. For the purpose of slaking, this mixture is fed into an insulated silo, where the mass is stored for 8 to 24 hours and is thoroughly slaked, whereby it forms a quantity of soluble silicic acid valuable for binding later, the portion obtained ranging from 1.5% to 5%. After the slaking this mixture is drawn from the silo and is thoroughly compounded with 200 kg. of Portland cement (standard 225) by either mixing or by further grinding and mixing. At this juncture the procedure is to again follow the examples outlined in 1(a) or 1(b) or as in Example 2, that is to say the amount of water necessary for plastic consistency is determined, the moldable final mixture is produced by further addition of water and coarse aggregates and if need be is molded and cured after storing or depositing the mass.

According to these examples molded products are obtained with a crude weight of about 2.2 at a strength of 1200 to 1500 kg. per square cm. according to the particular choice of the coarse aggregates. The portion of their binder, this is to say the portion of lime+cement, is 275 kg. per cubic meter.

If final products of less strength are desired then the water addition to the crude powder will be so adjusted that viscous, practically plastic consistency is necessary. The coarse aggregate mixed thereto in the case of like quantities as above of 2000 kg. is increased to 3000 kg. and is mixed and molded in like manner. The final products obtained as a result have a crude weight of about 2.3 with strengths of about 700 kg. per square cm. with a binder portion of lime + cement of 230 kg. per square cm. In case of the addition of 4000 kg. of coarse aggregate the strength is about 400 kg. per square cm. at a binder portion of 185 kg. per cubic meter.

The drawings characterize, by means of graphs, embodiments of the invention, the crest of the compression strength and maximum density curves of FIG. I and FIG. III illustrating preferred embodiments of the invention. FIG. I represents graphs showing physical and compositional properties of a plurality of molded bricks, cured in contact with live steam at 225 p.s.i. for 3.5 hours and made from cementitious materials and aggregate. The aggregate was sand that conformed substantially with zone II, of FIG. II which is described below. The horizontal axis of the graph represents the overall composition of the products in the ratio of 0 to 10 parts of aggregate per part of cementitious material in parts by dry weight. The vertical axis represents density, in kilo weight per decimeter volume; compression strength, in p.s.i.; percent $Ca(OH)_2$ content of cementitious material, based on total weight of cured product; and percent water absorption, by weight. Density is shown by the dotted curve; compression strength, by the solid curve; $Ca(OH)_2$ content, by the dashed curve; and moisture absorption after 24 hours in water at 20° C., by the dot-dash curve. The heavy dash line characterizes a variable coefficient more fully characterized hereinafter.

FIG. II is a graph showing the screen assay of aggregate used in the process of the invention.

FIG. III plots screen size vs compression strength for the products inter alia of the invention.

The cementitious material constitutes a CaO containing cement, such as Portland cement, common lime, burned or hydrated lime, dolomite lime, adamantine-cement, chalcedony-cement, or any suitable CaO containing material and siliceous material, such as common sand, quartz, tridymite, cristobalite, shale ash and other phenocrystalline and crytocrystalline minerals which have been comminuted and are preferably sharp in contrast to round in particle form. The aggregate assay, or screen size, is shown more particularly by FIG. II by zones.

FIG. II illustrates the screen size of aggregate used in the process of the invention. On the horizontal axis are plotted the screen size openings in common screen sizes No. 4 to No. 200 and in actual openings in the screens of 4.76 mm. to 0.074 mm. On the vertical axis are plotted the percent of material by weight that passes through the particular screen, or is held on the screen, the latter percent is vertical distance above the line, the former that distance below the line. The slant lines including Zone I is a preferred aggregate for use in the invention, Zone II including good aggregates while the aggregate of the outer Zones III–IV and beyond are not included by the invention for the preferred products. The zones to the right of Zone I approach an aggregate of increasingly uniform large sizes while zones to the left of Zone I approach an aggregate of increasingly uniform small sizes. On FIG. III is plotted a comparison of screen sizes of the aggregate vs. the water absorption at 20° C. and strength of the cured product in this case a molded brick containing 1 part of cementitious material and 4.5 part (by weight) of an aggregate (a Pine Hill sand) screened as shown. It will be evident that sand included by Zones I and II give products of high strength, while the Zone I area gives a product of superior strength. Moreover, like results are produced by compositions containing 1 part of cementitious material to 2.5 to 5.5 parts (all by weight) of the aggregate (cf. FIG. I).

As has been stated hereinbefore the moisture content of the composition prior to compression is important. The green product, i.e., a product containing binder, aggregate and water conforms prior to compaction, compression and curing with the following table:

*Table I*

| Binder to Aggretage | Density | Water Content, Percent by Weight | Water in Binder, Percent | State |
|---|---|---|---|---|
| 1:0 | 1.37 | 18 | 18 | Plastic consistency. |
| 1:1 | 1.8 | 10 | 20 | Do. |
| 1:2 | 2.0 | 8.4 | 25.1 | Viscous. |
| 1:2.5 | | 8.2 | | Do. |
| 1:3 | 2.05 | 8.0 | 32 | Do. |
| 1:4 | 2.15 | 7.5 | 37.5 | Do. |
| 1:5 | 2.10 | 7.0 | 42 | Liquid. |
| 1:55 | | 6.8 | | Do. |
| 1:6 | 2.08 | 6.6 | 46.1 | Do. |
| 1:7 | 2.07 | 6.32 | 50.5 | Do. |
| 1:8 | 2.05 | 6 | 54 | Do. |
| 1:9 | 2.05 | 5.7 | 57 | Do. |
| 1:10 | 2.04 | 5.4 | 59.5 | Do. |

While the green products of Table I between 1:2 and 1:6 binder to aggregate produce exceptionally strong products after compression and curing the preferred products of the invention are formed from products containing ratios of binder to aggregate between 1:2.5 and 1:5.5 with aggregates of Zones I or II, with a dry binder containing up to 40% to 50% by weight of $Ca(OH)_2$. Mixes with coarser aggregate, aggregate of Zone I, for example, leaving residue over the screen No. 8 of approximately 35% by volume require 15% by weight less water while a fine aggregate, i.e., one with a no residue on screen No. 16 and about 20% by volume on screen No. 30 will give improved results if 20% by weight or more water is used.

High density high strength molded concrete products are produced from a mixture containing $Ca(OH)_2$, and sand all finely divided as well as aggregate and water by preparing a binder of $Ca(OH)_2$ containing material and sand each of which is comminuted to a powder that will enable all but from 5% to 15% to pass through a 4900 mesh screen, the binder provided 7.45 to 17.4%, based on the total weight of the cured product, of $Ca(OH)_2$ the remainder of the binder being sand powder and cement residues; adding 6.8% to 8.2% water based on total weight of the dry product to and mixing it into the binder; mixing one part by weight of the binder to 2 to 5.5 parts by weight of aggregate; molding, vibrating, and tamping at high steam pressures, the mixture of binder with aggregate to result in a product having: a density of from 2.0 to 2.4 after curing, shrinkages less than 0.1 mm. per meter after curing; and demolding and curing the resulting product mixture under pressure to a product which has a compressive strength of at least 1000 kg. per sq. cm.

It is deemed that water acts as a lubricant and in effecting that function assists in coating the particles of aggregate with the binder. As cases in point to illustrate this effect, mixtures were made containing one part of binder to five parts of aggregate and another with one part of binder to three parts of aggregate. The table below gives the effect of varying the water content on the compression strength (in p.s.i.) of the cured cementitious material.

*Table II*

[Water Content by Weight]

| Composition | 3% | 4% | 5% | 6% | 7% | 8% |
|---|---|---|---|---|---|---|
| 1:3 | [1] 8,500 | 9,600 | 11,000 | 12,400 | 13,500 | 14,800 |
| 1:5 | [1] 7,000 | 8,500 | 10,000 | 11,500 | 12,900 | 14,400 |

[1] P.s.i.

Highest densities and compactness are obtainable if the above percentages of water are used and such densities give the highest physical values. With an aggregate of Zone II and with a 1:1 mixture of binder to aggregate, the green product to fully compacted volume (i.e., the compaction ratio) of the wet composition is in the order of 1 to 1.9 for optimum density and maximum strength. Excellent results, however, are obtained with compaction ratios between 1 to 1.75 and 1 to 2.2. These compactions are in contradistinction to the sandlime bricks of the art which result from compaction ratios between 1 to 1.5 and 1 to 1.6. The preferred products have the 1/1.75 to 1/2.2 compaction.

The green product, we have seen, should contain an aggregate all particles of which are encased and wholly circumscribed by the comminuted binder. Thorough mixing of the binder with the aggregate, malaxation of the resulting mixture conjointly with compaction in the presence of the amount of water described in Table I are prerequisites to a contiguous coating of each particle of aggregate and realization of a product having maximum compression strength and minimum shrinkage. The compaction is preferably effected in a mold wherein the green product is subjected to vibration and/or to intermittent blows of molding machine hammers or other well known means of applying compression of 200 to 1,000 p.s.i. or more for periods of up to 2 hours or more. By such compaction, the desirable densities and compaction are produced. The resulting product with acceptable green strength (i.e., adequate demolded strength for handling) is then cured and hardened in a suitable autoclave under high pressures and temperatures, in preferably a live steam environment, which ranges from 100 to 500 p.s.i. for 2 to 6 hours, to dry and cure the product and to form what are deemed to be mono-calcium hydrosilicates and mono-calcium aluminates, constituting up to 90% of the binder content, and formed by chemical reactions which chemicals fill completely aggregate voids, completely surround aggregate particles, and firmly bind the aggregate particles together.

An interesting phenomena has been discovered and made evident by a comparison of water absorption of the cured product at 10° C. for 24 hours with water absorption at 100° C. for 5 hours. A break occurs in the coefficient, i.e., the quotient of the former over the latter. The break in the coefficient indicates, it has been found, a resistance of the product to freezing, the break occuring with coefficient below .85. To the right of this coefficient (cf. FIG. I) a compaction of the product is effected by the binder filling all interstices in the highly compacted aggregate with the least amount of bonding material. In this area and for optimum results Zone II aggregate is recommended.

Many changes can be made in the process conditions and in the product ingredient proportions of the invention without departing from the invention or the scope of the claims.

I claim:

1. A process for the production of high density high strength molded concrete products from a mixture containing Portland cement, lime, and sand all finely divided as well as aggregate and water, the steps which comprise:
   (a) preparing a binder of lime, cement and sand each of which comminuted to a powder that will enable all but from 5% to 15% to pass through a 4900 mesh screen, the binder containing by weight 4% to 32% cement, 8% to 36% lime CaO making a total of 40% CaO plus cement and the remainder sand powder:
   (b) adding water to and mixing it into the binder in sufficient amounts to give a viscous to plastic consistency:
   (c) mixing one part by weight of the binder to 2 to 4 parts by weight of aggregate:
   (d) molding, vibrating, and tamping at high pressures, the mixture of binder with aggregate to result in a product having:
      x. a density of from 2.0 to 2.4 g./c.c. and on final curing
      y. shrinkages less than 0.1 mm. per meter; and
   (e) demolding and curing the resulting product mixture under steam pressure to a product having a compressive strength of at least 1000 kg. per sq. cm.

2. A process according to claim 1 wherein the binder is first prepared by kneading to a viscous consistency when the proportion of the finely ground Portland cement, lime, and sand to coarse aggregate is below 1 to about 2.5.

3. A process according to claim 1 wherein the binder is first prepared by kneading to a plastic consistency when the proportion of finely ground Portland cement, lime, and sand to coarse aggregate is above 1 to about 2.5.

4. The process of claim 1 in which the binder contains 12% to 26% by weight of cement and 14% to 28% by weight of CaO.

5. A precast compressed concrete finished product having 2 to 4 parts by weight of an aggregate per part by weight of binder, a density of 2.0 to 2.4 g./c.c., a shrinkage of less than 0.1 mm. per meter, and a compressive strength of 1000 to 1500 kg. per square cm., the binder having about 40% by weight of cement and lime, about 60% by weight of sand ground to a fineness that will enable all but 5% to 15% to pass through a 4900 mesh screen, the aggregate having a granulation of about 0.5 mm. to 50 mm. and the finished product having 240 to 300 kg. of lime and cement by weight per cubic meter.

6. A precast compressed finished product of claim 5 in which the binder contains 12% to 26% by weight of Portland cement and 14% to 28% by weight of CaO.

7. A precast compressed finished product of claim 5 in which the finished product has about 2 to 3 parts by weight of aggregate per part by weight of binder.

8. A precast compressed concrete finished product having 2 to 5.5 parts by weight of an aggregate per part by weight of binder, a density of 2.0 to 2.4 g./c.c., a shinkage of less than 0.1 mm. per meter, and a compressive strength of 1000 to 1500 kg. per square cm., the binder having about 40% by weight of CaO cement, with cement 4% to 32% by weight and $Ca(OH)_2$ 8% to 36% by weight and about 60% by weight of sand ground to a fineness that will enable all but 5% to 15% to pass through a 4900 mesh screen, the aggregate having a screen size selected from the group consisting of Zones I and II.

References Cited by the Examiner

UNITED STATES PATENTS

| | | | |
|---|---|---|---|
| 1,567,277 | 12/1925 | Labbe | 106—98 |
| 1,712,818 | 5/1929 | Forsen | 106—98 |
| 1,867,535 | 7/1932 | Adler | 106—98 |
| 2,227,790 | 1/1941 | Morton | 106—98 |
| 2,407,739 | 9/1946 | Ferraute | 106—98 |
| 2,410,954 | 11/1946 | Sharp | 106—98 |
| 2,751,308 | 6/1956 | Arrighini | 106—98 |
| 2,803,556 | 8/1957 | Carlsson et al. | 106—98 |
| 2,827,386 | 3/1958 | Zimmerman et al. | 106—98 |

TOBIAS E. LEVOW, *Primary Examiner.*